United States Patent  (10) Patent No.: US 9,598,130 B2
Kawai et al.  (45) Date of Patent: Mar. 21, 2017

(54) REAR FENDER FOR VEHICLE (71) Applicant: KAWASAKI JUKOGYO KABUSHIKI KAISHA, Kobe-shi, Hyogo (JP)

(72) Inventors: Hideaki Kawai, Kakogawa (JP); Shigeyuki Iwata, Kakogawa (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 0 days.

(21) Appl. No.: 14/857,584

(22) Filed: Sep. 17, 2015

(65) Prior Publication Data

US 2016/0096572 A1 Apr. 7, 2016

(30) Foreign Application Priority Data

Oct. 2, 2014 (JP) ................................. 2014-203799

(51) Int. Cl.
*B62J 9/00* (2006.01)
*B62J 15/00* (2006.01)
*B62K 19/30* (2006.01)

(52) U.S. Cl.
CPC ............... *B62J 9/001* (2013.01); *B62J 15/00* (2013.01); *B62K 19/30* (2013.01)

(58) Field of Classification Search
CPC .............. B62J 9/001; B62J 15/00; B62J 9/00
USPC ..................... 180/218, 219, 220; 280/288.4
See application file for complete search history.

(56) References Cited

U.S. PATENT DOCUMENTS

| | | | | |
|---|---|---|---|---|
| 6,349,783 B1* | 2/2002 | Galbraith | ................. | B62J 9/001 180/219 |
| 7,571,921 B1* | 8/2009 | Hoeve | ........................ | B62J 1/14 180/219 |
| 2003/0010555 A1* | 1/2003 | Galbraith | ................... | B62J 9/00 180/219 |
| 2014/0191006 A1* | 7/2014 | Schanz | .................... | B62J 9/001 224/413 |

FOREIGN PATENT DOCUMENTS

| | | |
|---|---|---|
| JP | S62176088 U | 11/1987 |
| JP | 10-76983 A | 3/1998 |
| JP | 2011225147 A | 11/2011 |

OTHER PUBLICATIONS

European Patent Office, Extended European Search Report Issued in Application No. 15187454.2, Feb. 12, 2016, Germany, 8 pages.

* cited by examiner

*Primary Examiner* — Tony Winner
(74) *Attorney, Agent, or Firm* — Alleman Hall McCoy Russell & Tuttle LLP (57) ABSTRACT

A vehicle comprises a fender unit which covers an upper portion of a wheel from above; and a mounting member placed inward in a vehicle width direction relative to the fender unit and including a mounting section by which an accessory component is detachably mounted to a vehicle body, wherein the fender unit includes: a first cover member which has an opening through which the mounting section of the mounting member is exposed, and covers a portion of the mounting member which is other than the mounting section, from outside in the vehicle width direction; and a second cover member which is detachably mounted to the first cover member and covers the opening.

10 Claims, 5 Drawing Sheets

REAR FENDER FOR VEHICLE

CROSS-REFERENCE TO THE RELATED APPLICATION

This application claims priority to and the benefit of Japanese Patent Application No. 2014-203799, filed on Oct. 2, 2014, the entire disclosure of which is incorporated herein by reference.

BACKGROUND OF THE INVENTION

Field of the Invention

The present invention relates to a vehicle. Particularly, the present invention relates to a vehicle to which an accessory component such as a saddle bag or a pannier case is detachably mountable.

Description of the Related Art

In some cases, a vehicle such as a motorcycle is equipped with an accessory component such as a saddle bag accommodating a rider's baggage or tools or a backrest used by a passenger for resting their back (e.g., Japanese Laid-Open Patent Application Publication No. Hei. 10-76983). For example, the saddle bag is mounted to the vehicle body frame of the vehicle via a stay used for supporting the saddle bag and a bracket to which this stay is fastened.

In a case where the saddle bag is placed on each of right and left sides relative to a rear wheel, the bracket may be fastened to the vehicle body frame located above the rear wheel, before the saddle bag is mounted to the vehicle body frame. In this structure, the side surface of a rear fender is detachable so that the stay used for retaining the saddle bag can be fastened.

SUMMARY OF THE INVENTION

However, the side surface of the rear fender is detached after the saddle bag is mounted to the vehicle body frame via the stay fastened to the bracket. Therefore, the external appearance of the vehicle may be degraded.

In view of the above, an object of the present invention is to mount the accessory component to the vehicle body frame without degrading the external appearance of the vehicle.

According to an aspect of the present invention, a vehicle comprises a fender unit which covers an upper portion of a wheel from above; and a mounting member placed inward in a vehicle width direction relative to the fender unit and including a mounting section by which an accessory component is detachably mounted to a vehicle body, wherein the fender unit includes: a first cover member which has an opening through which the mounting section of the mounting member is exposed, and covers a portion of the mounting member which is other than the mounting section, from outside in the vehicle width direction; and a second cover member which is detachably mounted to the first cover member and covers the opening.

In accordance with this configuration, when an accessory component such as a pannier case or a saddle bag is mounted to the vehicle body, the mounting, section of the mounting member is exposed through the opening of the first cover member by merely detaching the second cover member without detaching the first cover member. Therefore, the accessory component can be mounted to the mounting member while maintaining a state in which the mounting member is covered by the first cover member. As a result, the accessory component can be mounted to the vehicle body without degrading the external appearance of the vehicle which is a straddle type vehicle.

In the above vehicle, the fender unit may further include a body cover member which covers the upper portion of the wheel from above and a side, and the first cover member and the second cover member may be placed outward in the vehicle width direction relative to the body cover member.

In accordance with this configuration, the separate members of the fender unit serve as a fender which is a mud guard by covering the upper portion of the wheel and as a cover covering the mounting member. In this way, the fender unit can have a structure specialized for the fender and the cover.

The above vehicle may further comprise a vehicle body frame; and a pair of rail members, each of the rail members being configured such that at least a rear portion thereof is placed inward in the vehicle width direction relative to the first cover member, and a front portion thereof is connected to the vehicle body frame, wherein the pair of rail members extend in a forward and rearward direction from a rear portion of the vehicle body frame and are placed on both sides outward in the vehicle width direction relative to side surfaces of the wheel such that the rail members are spaced apart from each other in the vehicle width direction, and wherein the mounting member is fastened to each of the rail members in a location that is outward in the vehicle width direction relative to the rail member.

In accordance with this configuration, since the mounting member is fastened to the rail member in a location that is outward in the vehicle width direction relative to the rail member, it becomes possible to prevent interference in the vehicle width direction between the mounting member and the wheel. In addition, the rail members can be made close to a location at which the rail members do not interfere with the wheel, as compared to a case where the mounting member is placed inward in the vehicle width direction relative to the rail member. Therefore, a spacing (distance) between the pair of rail members in the vehicle width direction can be reduced.

The above vehicle may further comprise a pair of reinforcement members configured such that rear portions thereof are connected to the pair of rail members, respectively, and front portions thereof are connected to the vehicle body frame, wherein a location at which each of the reinforcement members is connected to the vehicle body frame may be below a location at which each of the rail members is connected to the vehicle body frame, and the first cover member may cover a rear portion of each of the reinforcement members.

In accordance with this configuration, a truss frame structure can be formed by the vehicle body frame, the rail members, and the reinforcement members, which can improve the stiffness of the vehicle body of the vehicle. In addition, since the first cover member covers the rear portion of the reinforcement member, the external appearance of the vehicle can be improved.

In the above vehicle, each of the reinforcement members may be provided separately from the mounting member, and a rear end portion of the each of reinforcement members and a front end portion of the mounting member may be detachably coupled to each other.

If the reinforcement member is integrated with the mounting member and thereby the length of the reinforcement member is increased, the inner diameters of insertion holes formed on the reinforcement member, into which fastening members such as screws or bolts are inserted, are unavoidably set larger than the outer diameters of the fastening members, due to tolerances. Under this condition, for example, the fastening member and the reinforcement member cannot be firmly fastened to each other. However, in the above configuration in which the reinforcement member and the mounting member are separate members, the dimension of the reinforcement member and the dimension of the mounting member can be managed independently. Therefore, it is not necessary to excessively increase the inner diameters of the insertion holes formed on the reinforcement member with respect to the outer diameters of the fastening members, and a firm fastening state can be obtained.

In the above vehicle, each of the reinforcement members may have a tubular shape extending in the forward and rearward direction and having an inner hollow space, and the mounting member may have a plate shape having a dimension in the vehicle width direction that is smaller than a dimension of the reinforcement member in the vehicle width direction.

In accordance with this configuration, the mounting member has the plate shape having a dimension in the vehicle width direction that is smaller than a dimension of the tubular reinforcement member in the vehicle width direction. Therefore, as compared to a case where the mounting member is formed to have a tubular shape integrated with the reinforcement member, it becomes possible to reduce the dimension in the vehicle width direction, of a portion of the vehicle body which is rearward relative to the location at which the reinforcement member is connected to the rail member, while reducing the weight of the reinforcement member.

In the above vehicle, an outer surface of the second cover member in the vehicle width direction may be coplanar with an outer surface of the first cover member in the vehicle width direction.

In accordance with this configuration, since the outer surface of the second cover member is coplanar with the outer surface of the first cover member, there is no level difference at a boundary between the first cover member and the second cover member. Therefore, the dimension in the vehicle width direction, of the rear part of the vehicle body can be reduced, in a state in which the accessory component is not yet mounted to the vehicle body.

The above and further objects, features, and advantages of the present invention will be more fully apparent from the following detailed description of preferred embodiment with accompanying drawings.

DETAILED DESCRIPTION OF THE EMBODIMENTS

Hereinafter, the embodiment of the present invention will be described with reference to the drawings. Throughout the drawings, the same or corresponding components are designated by the same reference symbols, and will not be described repeatedly. The stated directions are from the perspective of a rider straddling a motorcycle. A vehicle width direction of the vehicle body of the motorcycle corresponds with a rightward and leftward direction.

[Configuration of Motorcycle]

Figure 1:
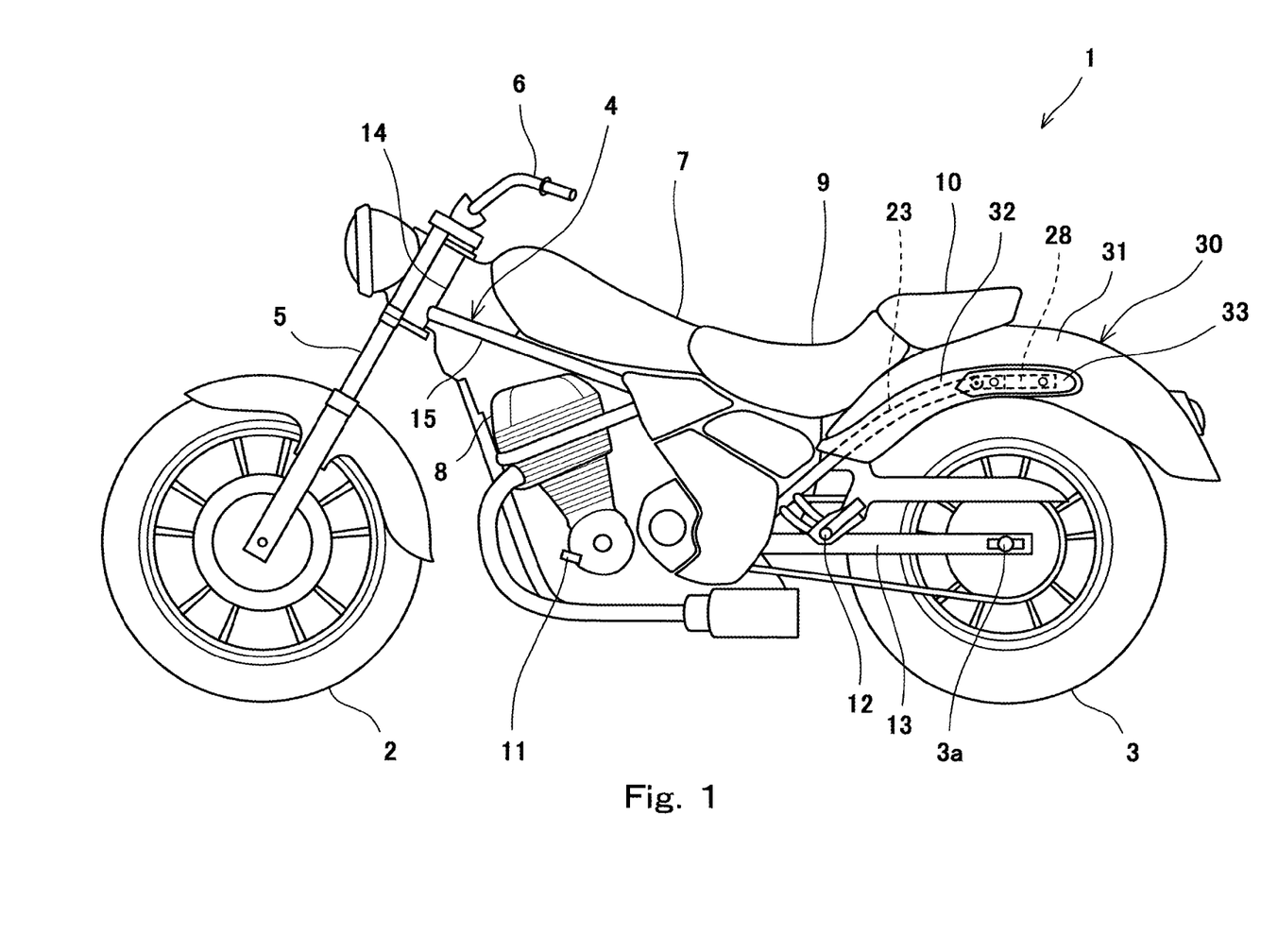
FIG. 1 is a left side view of a motorcycle as an exemplary vehicle according to an embodiment.
Figure 2:
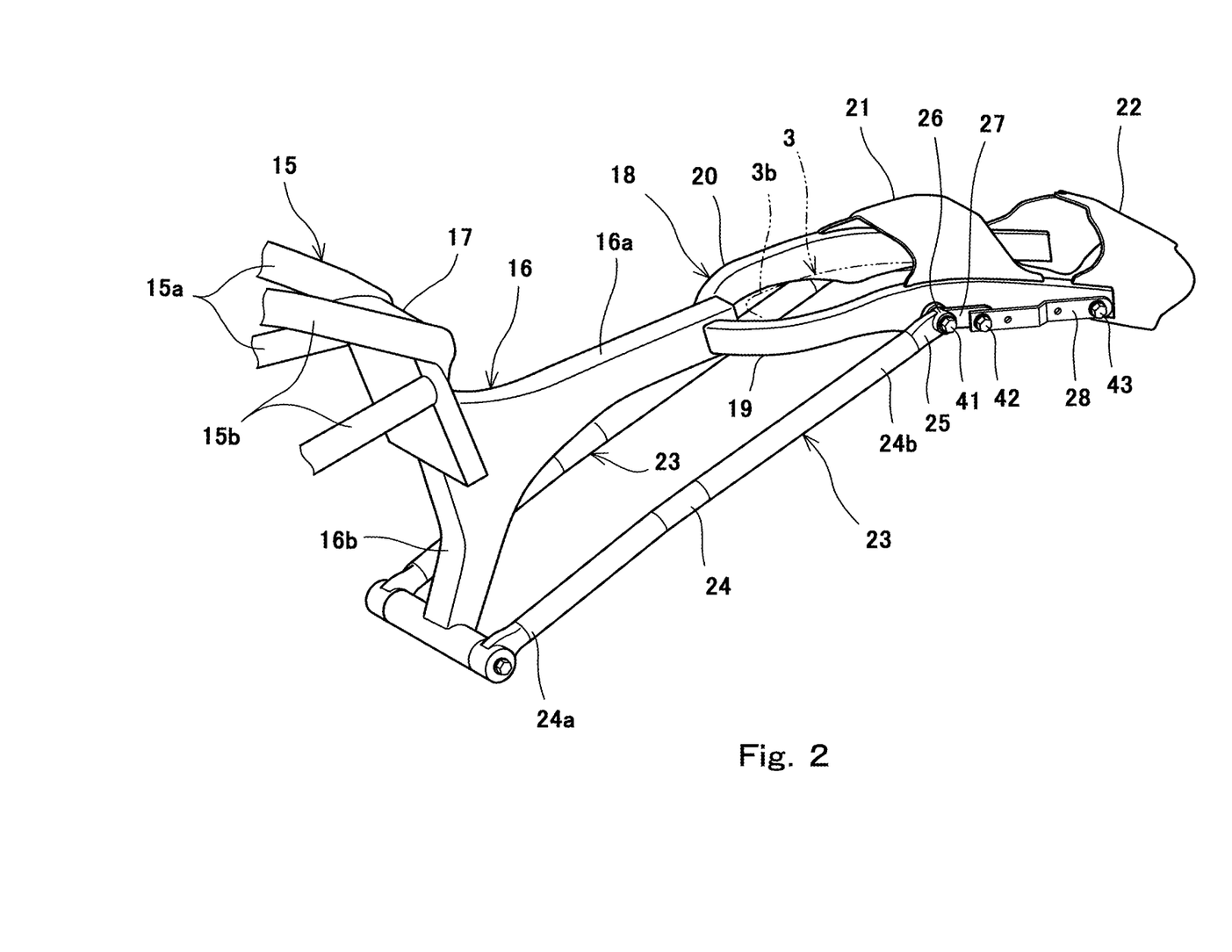
FIG. 2 is a perspective view showing a portion of a vehicle body frame of FIG. 1.
Figure 3:
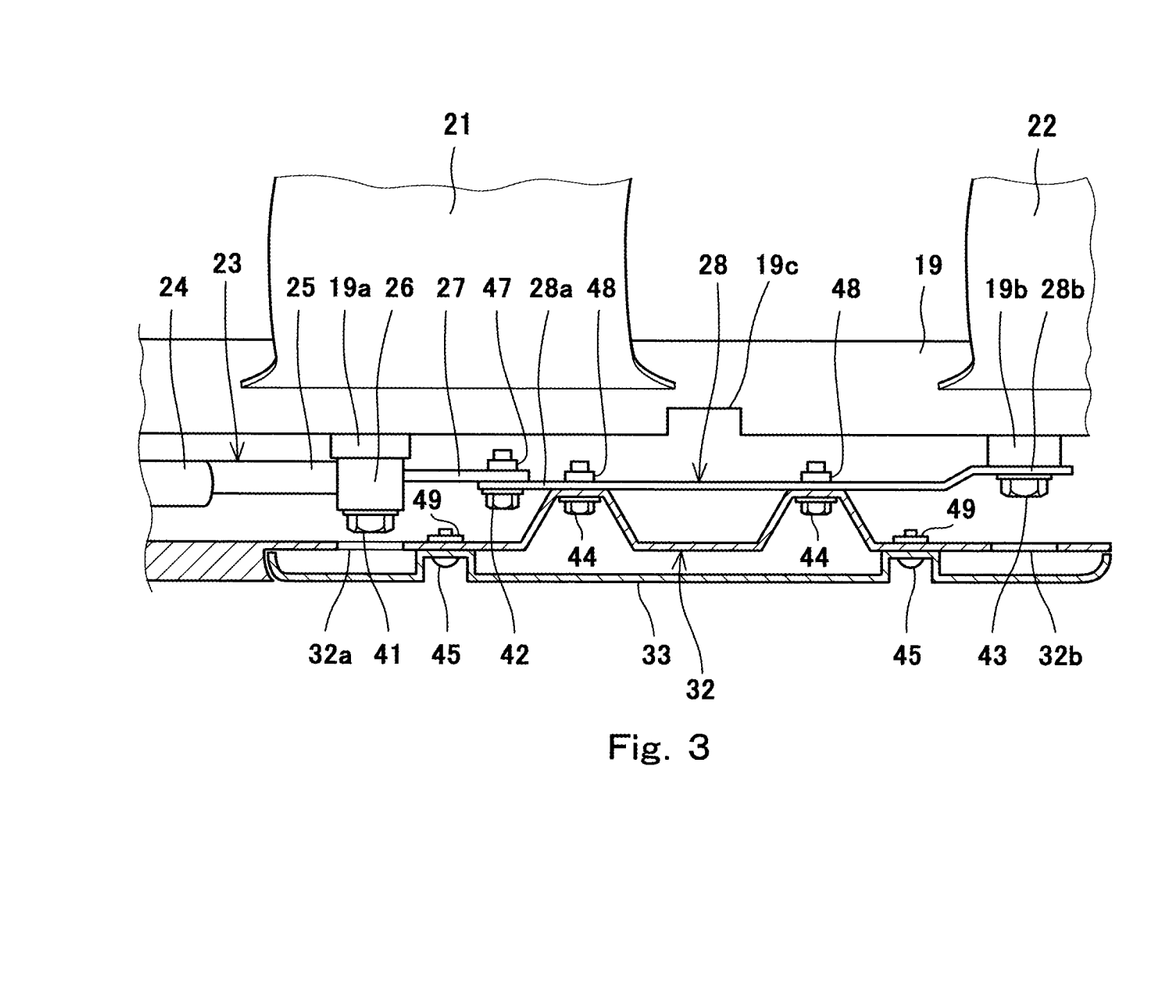
FIG. 3 is a schematic view showing the layout of a reinforcement member, a mounting member, a first cover member, and a second cover member of FIG. 1.
Figure 4:
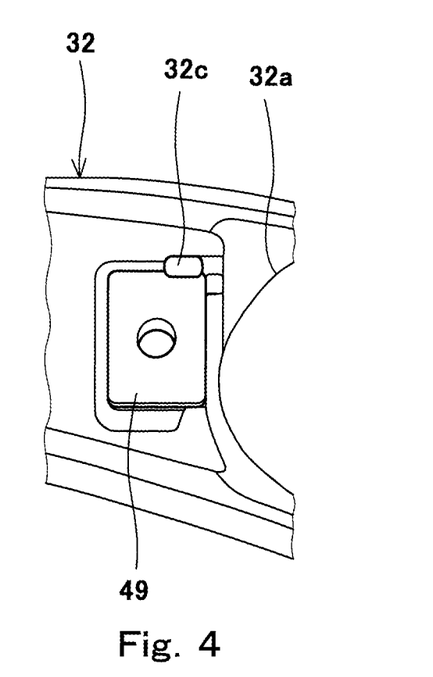
FIG. 4 is a partially enlarged perspective view showing the inner side surface of the first cover member of FIG. 1, in a vehicle width direction.
Figure 5:
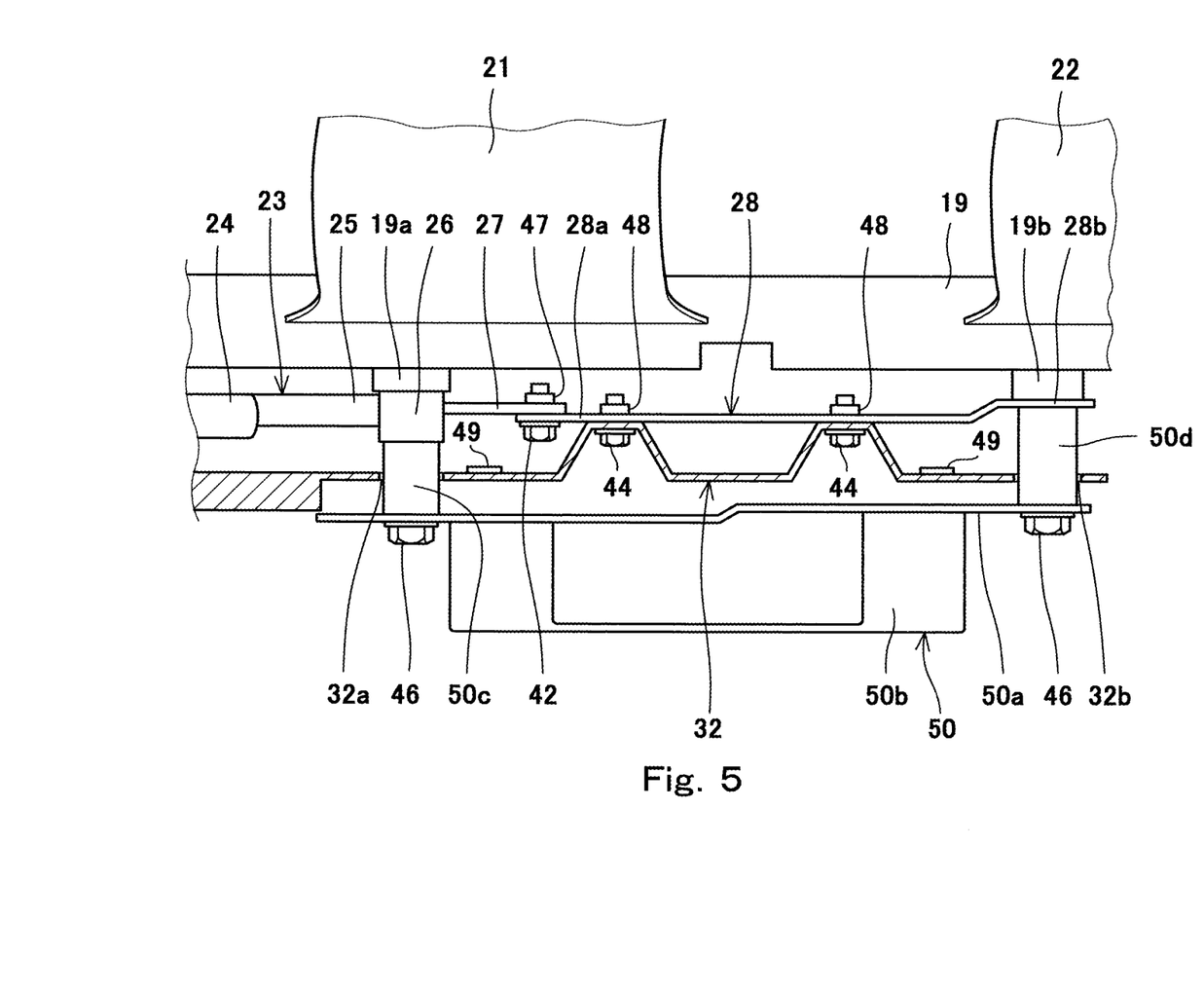
FIG. 5 is a schematic view showing a state in which an accessory component is mounted to a vehicle body frame after the second cover member of FIG. 1 is detached.

FIG. 1 is a left side view of a motorcycle 1 as an exemplary vehicle according to the embodiment. FIG. 2 is a perspective view showing a portion of a vehicle body frame 4 of FIG. 1. FIG. 3 is a schematic view showing the layout of a reinforcement member 23, a mounting member 28, a first cover member 32, and a second cover member 33 of FIG. 1. FIG. 4 is a partially enlarged perspective view showing the inner side surface of the first cover member 32 of FIG. 1, in the vehicle width direction. FIG. 5 is a schematic view showing a state in which an accessory component 50 is mounted to the vehicle body frame 4, after the second cover member 33 of FIG. 1 is detached.

As shown in FIG. 1, motorcycle 1 includes a front wheel 2, a rear wheel 3 which is a drive wheel, and the vehicle body frame 4 placed between the front wheel 2 and the rear wheel 3. The front wheel 2 is rotatably mounted to the lower end portion of a front fork 5 extending substantially vertically. A handle 6 extending in the rightward and leftward direction is rotatably attached to the upper end portion of the front fork 5 via a bracket and a steering shaft (not shown). The handle 6 is located above the upper surface of a fuel tank 7 mounted onto the vehicle body frame 4. A rider seat 9 on which the rider can be seated is placed behind the fuel tank 7, and a tandem seat 10 on which a passenger can be seated is placed behind the rider seat 9. The center portion of the rider seat 9 in the forward and rearward direction is located below both of the end portions of the rider seat 9 in the forward and rearward direction. In front of the rider seat 9, footrests 11 on which the rider straddling the rider seat 9 rests their feet are provided on the right and left sides of the vehicle body. Also, in front of the rear wheel 3, footrests 12 on which the passenger straddling the tandem seat 10 rests their feet are provided on the right and left sides of the vehicle body.

The rear wheel 3 is supportedly mounted to the vehicle body frame 4 via a swing arm 13. The front end portion of the swing arm 13 is mounted to the vehicle body frame 4 such that the swing arm 13 is vertically pivotable. The rear end portion of the swing arm 13 supports an axle 3a of the rear wheel 3 such that the swing arm 13 is rotatable. The rear wheel 3 overlaps with a fender unit 30 when viewed from the side. In the present embodiment, the fender unit 30 is a rear fender.

The rear fender 30 is molded using a resin. The rear fender 30 includes a body cover member 31, the first cover member 32 and the second cover member 33. The body cover member 31 covers the upper portion of the rear wheel 3 from above and the side. This allows the body cover member 31 to serve as a fender which is a mud guard. The first cover member 32 and the second cover member 33 are placed outward in the vehicle width direction relative to the body cover member 31. The structure of the first cover member 32 and the structure of the second cover member 33 will be described in detail later.

[Vehicle Body Frame]

As shown in FIGS. 1 and 2, the vehicle body frame 4 includes a head pipe 14, a front frame 15 extending rearward from the head pipe 14, and a rear frame 16 extending rearward from the rear end of the front frame 15. An engine (motor) 8 is mounted to the vehicle body frame 4, below the front frame 15 (see FIG. 1). The front frame 15 includes a pair of right and left frame members 15a, 15b extending rearward from the lower portion of the head pipe 14, to be spaced apart from each other in the rightward and leftward direction (see FIG. 2). Each of the pair of right and left frame members 15a, 15b includes two frame members such as round pipes which are disposed at an upper side and a lower side, respectively. The rear ends of the pair of right and left frame members 15a, 15b are coupled to each other by a cross member 17 and coupled to the rear frame 16 via the cross member 17.

As shown in FIG. 2, the rear frame 16 includes a rear stay member 16a, and a pivot frame member 16b. The rear stay member 16a comprises a single frame member extending in the forward and rearward direction. The front portion of the rear stay member 16a is welded to the cross member 17. The pivot frame member 16b extends downward from the front portion of the rear stay member 16a. The front end portion of the swing arm 13 is supportedly mounted to the pivot frame member 16b such that the swing arm 13 is pivotable. A pair of rail members 18 are connected to the rear end of the rear stay member 16a. The rear stay member 16a is not limited to the single frame member extending in the forward and rearward direction. The rear stay member 16a may include a pair of right and left frame members extending rearward from the rear end of the front frame 15, to be spaced apart from each other in the rightward and leftward direction.

[Rail Member]

As shown in FIG. 2, the pair of rail members 18 extend rearward from the rear end of the rear stay member 16a in the forward and rearward direction. The pair of rail members 18 include the left rail member 19 and the right rail member 20 which extend from the rear end of the rear stay member 16a to be spaced apart from each other in the rightward and leftward direction. The vertical thickness of each of the left rail member 19 and the right rail member 20 is varied in the forward and rearward direction. The vertical thickness of the substantially center portion in the forward and rearward direction, of each of the left rail member 19 and the right rail member 20, is set larger than those of both of the end portions in the forward and rearward direction, of each of the left rail member 19 and the right rail member 20.

The left rail member 19 and the right rail member 20 are placed outward in the vehicle width direction relative to the side surfaces of the rear wheel 3 such that the left rail member 19 and the right rail member 20 are spaced apart from each other in the vehicle width direction. The upper portion 3b of the rear wheel 3 can be partially accommodated in a space surrounded by the left rail member 19 and the right rail member 20. In a state in which the swing arm 13 is pivoted to become closest to the left rail member 19 and the right rail member 20, a portion of the left rail member 19 and a portion of the right rail member 20 overlap with a portion of the rear wheel 3, when viewed from the side. The left rail member 19 and the right rail member 20 support the body cover member 31 (not shown).

The left rail member 19 and the right rail member 20 are connected to each other in the rightward and leftward direction by first and second bridges sections 21, 22. The substantially center portion of the left rail member 19 in the forward and rearward direction and the substantially center portion of the right rail member 20 in the forward and rearward direction are connected to each other in the rightward and leftward direction, by the first bridge section 21. The rear end portion of the left rail member 19 and the rear end portion of the right rail member 20 are connected to each other in the rightward and leftward direction, by the second bridge section 22. A vertical clearance formed between the rear wheel 3 and each of the first and second bridge sections 21, 22 connecting the pair of rail members 18 to each other in the rightward and leftward direction is set to a requisite minimum value.

As shown in FIG. 3, the left rail member 19 includes protruding sections 19a, 19b protruding outward in the vehicle width direction from the left side surface thereof. The protruding sections 19a, 19b are placed to be spaced apart from each other in the forward and rearward direction. The protruding section 19a is located at the substantially center portion of the left rail member 19 in the forward and rearward direction. The protruding section 19b is located at the rear end portion of the left rail member 19. The protruding sections 19a, 19b are placed adjacently to the first and second bridge sections 21, 22, respectively. More specifically, the protruding section 19a is adjacent to the first bridge section 21, while the protruding section 19b is adjacent to the second bridge section 22. The protruding sections 19a, 19b are placed to overlap with the first and second bridge sections 21, 22, respectively, when viewed from the side.

The left side surface of the left frame 19 is provided with a support section 19c supporting the body cover member 31 serving as the fender which is the mud guard, in a location that is between the protruding sections 19a, 19b. The support section 19c is formed with a fitting portion which is recessed inward in the vehicle width direction such that a convex portion formed on the body cover member 31 is fitted into the fitting portion. In FIG. 3, the body cover member 31 is not shown.

A first fastening member 41 which will be described later is inserted into the protruding section 19a. A third fastening member 43 which will be described later is inserted into the protruding section 19b. The inner peripheries of the protruding sections 19a, 19b are formed with threads with which the fastening members 41, 43 are threadedly engaged, respectively. The reinforcement member 23 and a mounting member 28 are placed outward (in the present embodiment, leftward) in the vehicle width direction relative to the left rail member 19. Although the reinforcement member 23 and the mounting member 28 placed leftward relative to the left rail member 19 will be described hereinafter, the reinforcement member 23 and the mounting member 28 are placed outward (in the present embodiment, rightward) relative to the right rail member 20, in the same manner. In brief, the pair of right and left reinforcement members 23 are provided, and the pair of right and left mounting members 28 are provided.

[Reinforcement Member]

The reinforcement member 23 serves to increase the strength of the vehicle body frame 4. As shown in FIG. 2, the front portion of the reinforcement member 23 comprises a pipe section 24. The pipe section 24 has a tubular shape extending in the forward and rearward direction and having an inner hollow space. The front end portion 24a of the pipe section 24 corresponds to the front end of the reinforcement member 23. The front end of the reinforcement member 23 (the front end portion 24a of the pipe section 24) is connected to the pivot frame member 16b of the rear frame 16. Alternatively, pivot plates for reinforcing the pivot frame member 16b may be placed on the both sides in the vehicle width direction relative to the pivot frame member 16b, respectively, and the front ends of the reinforcement members 23 may be connected to the pivot frame member 16b via the pivot plates, respectively. A location at which the reinforcement member 23 is connected to the pivot frame member 16b of the rear frame 16 is below a location at which the left rail member 19 is connected to the rear frame 16.

A flat section 25 has a flat shape and is integrated with the rear end portion 24b of the pipe section 24. The flat section 25 has a dimension in the vehicle width direction that is smaller than that of the pipe section 24. Hereinafter, a portion of the reinforcement member 23 which is located rearward relative to the rear end portion 24b of the pipe section 24 will be referred to as the rear portion of the reinforcement member 23.

The rear portion of the reinforcement member 23 includes the flat section 25, a connection section 26, and a plate section 27. The connection section 26 is a cylindrical member located rearward relative to the flat section 25. The connection section 26 is connected to the rear end of the flat section 25, by welding or the like. The connection section 26 overlaps with the protruding section 19a of the left rail member 19 in the vehicle width direction (see FIG. 3). The reinforcement member 23 is fastened to the protruding section 19a of the left rail member 19 in such a manner that the first fastening member 41 is inserted into the connection section 26. In other words, the connection section 26 corresponds to the location at which the reinforcement member 23 is connected to the left frame member 19. The first fastening member 41 is, for example, a bolt.

The plate section 27 is a plate member located rearward relative to the connection section 26. The front end of the plate section 27 is joined to the connection section 26 by welding, or the like. As shown in FIG. 3, the plate section 27 has a dimension in the vehicle width direction that is smaller than those of the flat section 25 and the connection section 26. The outer side surface (left side surface) of the plate section 27 in the vehicle width direction is located inward in the vehicle width direction relative to the outer side surface (left side surface) of the flat section 25 in the vehicle width direction. The plate section 27 corresponds to the rear end of the reinforcement member 23. The front end portion 28a of the mounting member 28 is detachably connected to the plate section 27. More specifically, a weld nut 47 is welded to the inner side surface of the plate section 27 in the vehicle width direction. The front end portion 28a of the mounting member 28 is fastened to the plate section 27 in such a manner that a second fastening member 42 is threadedly engaged with the weld nut 47. The second fastening member 42 is, for example, a bolt.

[Mounting Member]

The mounting member 28 is used to mount the first cover member 32 and the accessory component 50 which will be described later to the vehicle body of the motorcycle 1. As shown in FIG. 3, the mounting member 28 is placed in such a manner that its thickness direction corresponds with the vehicle width direction. The mounting member 28 is a plate member extending in the forward and rearward direction, and is separate from the reinforcement member 23. The outer side surface of the mounting member 28 in the vehicle width direction is located inward in the vehicle width direction relative to the outer side surface in the vehicle width direction, of the connection section 26 of the reinforcement member 23. As described above, the front end portion 28a of the mounting member 28 is connected to the plate section 27 of the reinforcement member 23 by use of the second fastening member 42. The rear end portion 28b of the mounting member 28 is fastened to the protruding section 19b of the left rail member 19 by use of the third fastening member 43 inserted into the protruding section 19b. In this configuration, the mounting member 28 is configured in such a manner that the front end portion 28a is fastened to the reinforcement member 23 and the rear end portion 28b is fastened to the left rail member 19 in locations that are outward in the vehicle width direction relative to the left rail member 19.

As shown in FIG. 1, the mounting member 28 is located outward in the vehicle width direction relative to the body cover member 31 of the rear fender 30. The rear end portion 28b of the mounting member 28 is fastened to the left rail member 19 along with the body cover member 31 of the rear fender 30, by use of the third fastening member 43 inserted into the protruding section 19b. In this way, the body cover member 31 of the rear fender 30 is supportedly mounted to the left rail member 19. The third fastening member 43 is, for example, a bolt.

A structure for mounting the accessory component 50 to the mounting member 28 will be described in detail later. In the present embodiment, the accessory component 50 is fastened to the rear end portion 28b of the mounting member 28, along with the left rail member 19, by use of a fastening member such as a bolt. Hereinafter, the rear end portion 28b of the mounting member 28, to which the accessory component 50 is mounted, will be referred to as a mounting section 28b of the mounting member 28.

The rear portion of the first cover member 32 of the rear fender 30 is detachably fastened to the mounting member 28 by use of fourth fastening members 44. More specifically, weld nuts 48 are welded to the inner side surface of the mounting member 28 in the vehicle width direction. The first cover member 32 is fastened to the mounting member 28 in such a manner that the fourth fastening members 44 are threadedly engaged with the weld nuts 48, respectively. The fourth fastening member 44 is, for example, a bolt.

[First Cover Member and Second Cover Member]

As shown in FIG. 3, the first cover member 32 fastened to the mounting member 28 has in a rear portion thereof, an opening 32a through which the connection section 26 of the reinforcement member 23 is exposed, and an opening 32b through which the mounting section 28b of the mounting member 28 is exposed. The first cover member 32 covers the reinforcement member 23 except for a portion of the pipe section 24 and the connection section 26, from outside in the vehicle width direction. The first cover member 32 also covers a portion (remaining portion) of the mounting member 28 which is other than the mounting section 28b from outside in the vehicle width direction. The second cover member 33 is detachably fastened to the first cover member 32 by use of fifth fastening members 45, in a location that is outward in the vehicle width direction relative to the rear portion of the first cover member 32.

As shown in FIG. 4, the inner side surface of the first cover member 32 in the vehicle width direction is formed with a hook portion 32c protruding inward in the vehicle width direction. A nut member 49 into which each of the fifth fastening members 45 is inserted is engaged with the hook portion 32c. The fifth fastening member 45 is, for example, a bolt. The inner periphery of the nut member 49 is formed with a thread with which the fifth fastening member 45 is threadedly engaged. The second cover member 33 is fastened to the first cover member 32 in such a manner that the fifth fastening member 45 is threadedly engaged with the nut member 49. The lower portion of the first cover member 32 is formed with a stepped portion protruding outward in the vehicle width direction. The second cover member 33 is fitted to the stepped portion. In this configuration, a level difference between the first cover member 32 and the second cover member 33 is unnoticeable.

As shown in FIG. 1, the first cover member 32 and the second cover member 33 are placed on the lower portion of the left side surface of the body cover member 31. In this structure, the rear fender 30 has a double-walled cover structure formed by the first cover member 32 and the second cover member 33, on the outer side surface of the body cover member 31 in the vehicle width direction. The rear fender 30 serves as a cover covering a portion of the reinforcement member 23 and the mounting member 28, which can improve the external appearance of the vehicle body. At least a portion of the second cover member 33 overlaps with the rear wheel 3 when viewed from the side. The second cover member 33 extends in a substantially circular-arc shape around the axle 3a of the rear wheel 3.

As shown in FIG. 3, the second cover member 33 has a substantially-U shape in the cross-section taken along the vehicle width direction. Before mounting the accessory component 50, the second cover member 33 covers the rear portion of the first cover member 32 from outside in the vehicle width direction, and thus the openings 32a, 32b of the first cover member 32, and the fourth fastening members 44 are covered from outside in the vehicle width direction. That is, the second cover member 33 covers the location at which the reinforcement member 23 is fastened to the left rail member 19, the location at which the mounting member 28 is fastened to the first cover member 32, and the location at which the mounting member 28 is fastened to the left rail member 19.

The outer side surface of the second cover member 33 in the vehicle width direction is coplanar with the outer side surface of the first cover member 32 in the vehicle width direction. In the present embodiment, the first cover member 32 and the second cover member 33 are molded using a resin of the same color and the same kind.

[Mounting of Accessory Components]

Hereinafter, a structure for mounting the accessory component 50 such as the saddle bat or the pannier case to the vehicle body of the motorcycle 1 will be described. When the accessory component 50 is mounted to the vehicle body, only the second cover member 33 is detached from the rear portion of the first cover member 32 by unfastening the fifth fastening members 45, so that the openings 32a, 32b of the first cover member 32 can be seen. Therefore, even after the second cover member 33 is detached, a portion of the reinforcement member 23 which is other than the connection section 26, and a portion of the mounting member 28 which is other than the mounting section 28b are covered by the first cover member 32, from outside in the vehicle width direction.

The head portion of the first fastening member 41 is exposed through the opening 32a of the first cover member 32, while the head portion of the third fastening member 43 is exposed through the opening 32b of the first cover member 32. By loosening each of the exposed first fastening member 41 and the exposed third fastening member 43 by use of a tool, the first fastening member 41 and the third fastening member 43 are detached.

After the first fastening member 41 and the third fastening member 43 are detached, the connection section 26 of the reinforcement member 23 and the mounting section 28b of the mounting member 28, which are not covered with the first cover member 32, are exposed. The accessory component 50 is mounted to the exposed connection section 26 and the exposed mounting section 28b. Since the connection section 26 is connected to the protruding section 19a and the mounting section 28b is connected to the protruding section 19b, it may be said that the accessory component 50 is mounted to the protruding sections 19a, 19b of the left rail member 19.

Preferably, the accessory component 50 extends in the forward and rearward direction along the protruding sections 19a, 19b of the left rail member 19. Examples of the accessory component 50 include the saddle bag, the pannier case, a top case, the backrest, and mounting stays used to mount these accessory components to the vehicle body. One or a plurality of the accessory components 50 may be mounted to the protruding sections 19a, 19b of the left rail member 19. For example, the backrest or the top case, and the pannier case may be mounted to the protruding sections 19a, 19b. In the present embodiment, it is supposed that the accessory component 50 is a mounting stay used to mount the saddle bag or the pannier case to the vehicle body.

As shown in FIG. 5, the mounting stay 50 includes a plate section 50a extending in the forward and rearward direction, a support section 50b partially protruding outward (in the present embodiment, leftward) in the vehicle width direction from the plate section 50a to support the saddle bag or the pannier case, a first fastening section 50c protruding inward in the vehicle width direction from the plate section 50a and fastened to the connection section 26 of the reinforcement member 23, and a second fastening section 50d protruding inward in the vehicle width direction from the plate section 50a and fastened to the mounting section 28b of the mounting member 28. Six fastening members 46 are inserted into the first fastening section 50c and the second fastening section 50d, respectively, from outside in the vehicle width direction, and thus the mounting stay 50 is detachably fastened to the connection section 26 of the reinforcement member 23 and the mounting section 28b of the mounting member 28. Alternatively, the mounting stay 50 may be detachably fastened to the connection section 26 of the reinforcement member 23 and the mounting section 28b of the mounting member 28 by use of the first fastening member 41 and the third fastening member 43 as the sixth fastening members 46, to reduce the number of members.

[Advantages]

The motorcycle 1 which is an example of the vehicle configured as described above can obtain the following advantages.

The rear fender 30 includes the first cover member 32 and the second cover member 33 detachably mounted to the first cover member 32. When the accessory component 50 is mounted to the vehicle body frame 4, only the second cover member 33 is detached from the first cover member 32 without detaching the first cover member 32, and the mounting section (rear end portion) 28b of the mounting member 28 is exposed through the opening 32b of the first cover member 32. In this way, the accessory component (mounting stay) 50 can be mounted to the mounting member 28 without degrading the external appearance of the motorcycle 1 while maintaining a state in which the portion of the mounting member 28 which is other than the mounting section 28b is covered by the first cover member 32.

In addition, the accessory component 50 can be mounted to the vehicle body frame 4, to be precise, the protruding sections 19a, 19b of the left rail member 19, via the mounting section 28b of the mounting member 28, without detaching the whole of the rear fender 30. Therefore, mounting of the accessory component 50 can be easily carried out.

Even after the second cover member 33 is detached from the first cover member 32, the second fastening member 42 used to fasten the reinforcement member 23 to the mounting member 28 is covered by the first cover member 32, from outside in the vehicle width direction. Therefore, in a state in which the accessory component 50 is mounted to the vehicle body frame 4, the external appearance of the motorcycle 1 is not degraded.

The rear fender 30 further includes the body cover member 31 covering the upper portion 3b of the rear wheel 3 from above and the side. The first cover member 32 and the second cover member 33 are placed outward in the vehicle width direction relative to the body cover member 31. In this configuration, the separate members of the rear fender 30 serve as the fender which is the mud guard and as the cover covering a portion of the reinforcement member 23 and the mounting member 28 to maintain the good external appearance of the motorcycle 1. In this way, the rear fender 30 can have a structure specialized for the fender and the cover. For example, since the mounting member 28 which is separate from the vehicle body frame 4, can be placed outward in the vehicle width direction relative to the body cover member 31, the dimension of the rear fender 30 in the vehicle width direction can be reduced.

The protruding sections 19a, 19b of the left rail member 19 are positioned adjacently to the first and second bridge sections 21, 22 connecting the pair of rail members 19, 20 in the rightward and leftward direction. In this structure, the protruding sections 19a, 19b are provided on the portions of the left rail member 19 which are reinforced by the bridge sections 21, 22, respectively. Therefore, the accessory component 50 can be firmly mounted to the protruding sections 19a, 19b of the left rail member 19.

The protruding section 19b with which the sixth fastening member 46 is threadedly engaged is placed between the left rail member 19 and the mounting member 28 in the vehicle width direction. In this layout, the mounting stay 50 is fastened to the mounting member 28 by use of the sixth fastening member 46 and the protruding section 19b in a location that is outward in the vehicle width direction relative the left rail member 19. Therefore, as compared to a case where the inner portion of the left rail member 19 in the vehicle width direction is provided with a protruding section, there is no need to increase the dimension of the left rail member 19 in the vehicle width direction, to prevent the protruding section 19b from interfering with the rear wheel 3. Therefore, the component 50 can be mounted to the vehicle body frame 4, without increasing the dimension of the pair of rail members 18 in the vehicle width direction.

Before mounting the accessory component 50, the second cover member 33 covers the location at which the reinforcement member 23 is connected to the left rail member 19, the location at which the mounting member 28 is connected to the first cover member 32, and the location at which the mounting member 28 is connected to the left rail member 19, to prevent these locations fastened by use of the fastening members from being exposed. In this way, the external appearance of the motorcycle 1 can be improved.

The outer side surface of the second cover member 33 in the vehicle width direction is coplanar with the outer side surface of the first cover member 32 in the vehicle width direction. In this configuration, there is no level difference between the first cover member 32 and the second cover member 33. Therefore, the dimension in the vehicle width direction, of the rear part of the vehicle body can be reduced, in a state in which the mounting stay 50 is not yet mounted to the vehicle body frame 4.

The first cover member 32 and the second cover member 33 are molded using a resin of the same color and the same kind. Therefore, the second cover member 33 is unnoticeable, and hence the external appearance of the motorcycle 1 can be improved.

The nut member 49 into which the fifth fastening member 45 used to fasten the second cover member 33 to the first cover member 32 is inserted is engaged with the hook portion 32c provided on the first cover member 32. This allows the nut member 49 to be easily fastened to the first cover member 32 while preventing the nut member 49 from being disengaged from the hook portion 32c.

The pair of rail members 18 extend rearward from the rear end of the rear stay member 16a of the rear frame 16. The pair of rail members 18 are connected to the pivot frame member 16b of the rear frame 16 by the pair of reinforcement members 23. In this way, a truss frame structure can be formed by the vehicle body frame 4, the pair of rail members 18, and the pair of reinforcement members 23, which can improve the stiffness of the vehicle body of the motorcycle 1.

Each of the reinforcement members 23 is provided separately from the mounting member 28. If the reinforcement member 23 is integrated with the mounting member 28 and thereby the length of the reinforcement member 23 is increased, the inner diameters of the insertion holes formed on the reinforcement member 23, into which fastening members such as screws or bolts are inserted, are unavoidably set larger than the outer diameters of the fastening members, due to tolerances. Under this condition, for example, the first fastening member 41 and the connection section 26 of the reinforcement member 23 cannot be firmly fastened to each other, and the mounting location of the reinforcement member 23 cannot be easily fixed. However, in the configuration of the present embodiment in which the reinforcement member 23 and the mounting member 28 are the separate members, the dimension of the reinforcement member 23 and the dimension of the mounting member 28 can be managed independently. Therefore, it is not necessary to excessively increase the inner diameters of the insertion holes formed on the reinforcement member 23 with respect to the outer diameters of the fastening members. As a result, for example, the first fastening member 41 and the connection section 26 of the reinforcement member 23 can be firmly fastened to each other, and the mounting location of the reinforcement member 23 can be easily fixed.

The rear portion of the reinforcement member 23 includes the flat section 25 having a dimension in the vehicle width direction that is smaller than that of the pipe section 24, the connection section 26, and the plate section 27 having a dimension in the vehicle width direction that is smaller than that of the flat section 25. The rear portion of the reinforcement member 23 which is other than the connection section 26, is covered by the first cover member 32 from outside in the vehicle width direction, which can improve external appearance of the motorcycle 1. In addition, this makes it possible to suppress an increase in the dimension of the rear portion of the first cover member 32, which protrudes outward in the vehicle width direction, with respect to the body cover member 31. As a result, the dimension in the vehicle width direction, of the rear portion of the vehicle body can be reduced.

The outer side surface of the mounting member 28 in the vehicle width direction is located inward in the vehicle width direction relative to the outer side surface of the connection section 26 of the reinforcement member 23 in the vehicle width direction. The front end portion 28a of the mounting member 28 is fastened to the plate section 27 of the reinforcement member 23. In this configuration, since the mounting member 28 is fastened to the plate section 27 of the reinforcement member 23 in a location that is inward in the vehicle width direction relative to the connection section 26. That is, the location at which the mounting member 28 is fastened to the plate section 27 of the reinforcement member 23 is not outward in the vehicle width direction relative to the reinforcement member 23. In this configuration, a configuration in which the mounting member 28 is fastened to the plate section 27 of the reinforcement member 23 is unnoticeable, and the dimension in the vehicle width direction, of the rear portion of the vehicle body can be reduced.

The mounting member 28 is placed such that its thickness direction corresponds with the vehicle width direction, and is formed by the plate member extending in the forward and rearward direction. As compared to the configuration in which the mounting member is formed by a pipe member, an increase in the dimension of the vehicle body in the vehicle width direction can be prevented.

The mounting member 28 has a plate shape having a dimension in the vehicle width direction that is smaller than that of the tubular reinforcement member 23. In this configuration, as compared to a case where the mounting member 28 is formed to have a tubular shape integrated with the reinforcement member 23, it becomes possible to reduce the dimension in the vehicle width direction, of a portion of the vehicle body which is rearward relative to the location at which the reinforcement members 23 are connected to the pair of right and left rail members 18, respectively, while reducing the weight of the reinforcement members 23.

The mounting members 28 are placed outward in the vehicle width direction relative to the pair of right and left rail members 18. This makes it possible to prevent interference in the vehicle width direction between the mounting members 28 and the rear wheel 3. In addition, the pair of right and left rail members 18 can be made close to a location at which the pair of right and left rail members 18 do not interfere with the rear wheel 3, as compared to a case where the mounting members are placed inward in the vehicle width direction relative to the right and left rail members 18. Therefore, a spacing (distance) between the pair of right and left rail members 18 in the vehicle width direction can be reduced. Since the rear fender 30 is placed to overlap with the rear wheel 3 when viewed from the side, the motorcycle 1 of the present embodiment is identified as a motorcycle of an American type (cruiser type). In accordance with the configuration of the present embodiment, in the motorcycle 1 of the American type, the accessory component such as the saddle bag or the pannier case can be mounted to the vehicle body without degrading the external appearance of the motorcycle 1, and the dimension in the vehicle width direction, of the rear portion of the vehicle body, in a state in which the accessory component 50 is mounted to the vehicle body, can be reduced.

The present invention is not limited to the above-described embodiment. The above-described configuration may be changed, added to, or deleted from, within a scope of the spirit of the preset invention. This will be described specifically below.

Although in the above-described embodiment, the second cover member 33 is detachably fastened to the first cover member 32, another configuration may be employed so long as the second cover member 33 is detachably fastened to the vehicle body of the motorcycle 1 in a state in which the second cover member 33 covers the openings 32*a*, 32*b* of the first cover member 32. In other words, the second cover member 33 may be fastened to the mounting member 28, the body cover member 31, or each of the pair of rail members 18. Although in the above-described embodiment, the reinforcement members 23 are provided separately from the pair of right and left rail members 18, the reinforcement members 23 may be integrated with the pair of right and left rail members 18, respectively.

In the above-described embodiment, the rear fender 30 has the double-walled cover structure formed by the first cover member 32 and the second cover member 33, and only the second cover member 33 is detached from the first cover member 32, when the accessory component 50 is mounted to each of the right and left sides relative to the rear wheel 3. Alternatively, in a case where the accessory component is mounted to the upper portion of the front wheel 2 or the right and left sides relative to the front wheel 2, a front fender covering the upper portion of the front wheel 2 from above may have a double-walled cover structure.

Although in the above-described embodiment, the motorcycle of the American type (cruiser type) has been exemplarily described as the vehicle, the motorcycle may be a motorcycle of another type such as a road sport type, or the vehicle may be a three-wheeled vehicle, a four-wheeled vehicle, etc., to which the accessory component may be detachably mounted.

The vehicle of the present invention can obtain a clear advantage that an accessory component can be mounted to a vehicle body without degrading the external appearance of the vehicle, which is effectively applicable to any motorcycle which can exhibit this advantage.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A vehicle comprising:
   a fender unit which covers an upper portion of a wheel from above; and
   a mounting member placed inward in a vehicle width direction relative to the fender unit and including a mounting section by which an accessory component is detachably mounted to a vehicle body,
   wherein the fender unit includes:
   a first cover member which has an opening through which the mounting section of the mounting member is exposed, and covers a portion of the mounting member which is other than the mounting section, from outside in the vehicle width direction; and
   a second cover member which is detachably mounted to the first cover member and covers the first cover member from outside in the vehicle width direction to cover the opening.

2. The vehicle according to claim 1,
   wherein the fender unit further includes a body cover member which covers the upper portion of the wheel from above and a side, and
   wherein the first cover member and the second cover member are placed outward in the vehicle width direction relative to the body cover member.

3. The vehicle according to claim 1, further comprising:
   a vehicle body frame; and
   a pair of rail members, each of the rail members being configured such that at least a rear portion thereof is placed inward in the vehicle width direction relative to the first cover member, and a front portion thereof is connected to the vehicle body frame, wherein the pair of rail members extend in a forward and rearward direction from a rear portion of the vehicle body frame and are placed on both sides outward in the vehicle width direction relative to side surfaces of the wheel such that the rail members are spaced apart from each other in the vehicle width direction, and wherein the mounting member is fastened to each of the rail members in a location that is outward in the vehicle width direction relative to the rail member.

4. The vehicle according to claim 1, wherein an outer surface of the second cover member in the vehicle width direction is coplanar with an outer surface of the first cover member in the vehicle width direction, and the second cover member is fastened to the first cover member.

5. The vehicle according to claim 1 further comprising:

a first fastening member and a second fastening member which are inserted into the mounting member and a reinforcement member, respectively, from outside in the vehicle width direction and mounted to the vehicle body frame, wherein the second fastening member is located in front of the first fastening member, wherein the first cover member has a front opening located in front of the opening, and wherein the second cover member covers the opening and the front opening in a state in which a head portion of the first fastening member is exposed through the opening and a head portion of the second fastening member is exposed through the front opening.

6. The vehicle according to claim 1, wherein the wheel is a rear wheel, and wherein the fender unit includes a body cover member which covers an upper portion of the rear wheel from above and a side.

7. A vehicle comprising:

a vehicle body frame;

a fender unit which covers an upper portion of a wheel from above; and a mounting member placed inward in a vehicle width direction relative to the fender unit and including a mounting section by which an accessory component is detachably mounted to a vehicle body;

a pair of rail members having front portions connected to the vehicle body frame; and a pair of reinforcement members configured such that rear portions thereof are connected to the pair of rail members, respectively, and front portions thereof are connected to the vehicle body frame, wherein the fender unit includes:

a first cover member which has an opening through which the mounting section of the mounting member is exposed, and covers a portion of the mounting member which is other than the mounting section, from outside in the vehicle width direction; and a second cover member which is detachably mounted to the first cover member and covers the opening, wherein the pair of rail members extend in a forward and rearward direction from a rear portion of the vehicle body frame and are placed on both sides outward in the vehicle width direction relative to side surfaces of the wheel such that the rail members are spaced apart from each other in the vehicle width direction, and at least rear portions of the pair of rail members are placed inward in the vehicle width direction relative to the first cover member, wherein the mounting member is fastened to each of the rail members in a location that is outward in the vehicle width direction relative to the rail member, wherein a location at which each of the reinforcement members is connected to the vehicle body frame is below a location at which each of the rail members is connected to the vehicle body frame, and wherein the first cover member covers a rear portion of each of the reinforcement members.

8. The vehicle according to claim 7, wherein each of the reinforcement members is provided separately from the mounting member, and wherein a rear end portion of the each of reinforcement members and a front end portion of the mounting member are detachably coupled to each other.

9. The vehicle according to claim 7, wherein each of the reinforcement members has a tubular shape extending in the forward and rearward direction and having an inner hollow space, and wherein the mounting member has a plate shape having a dimension in the vehicle width direction that is smaller than a dimension of the reinforcement member in the vehicle width direction.

10. The vehicle according to claim 7, wherein an outer surface of the second cover member in the vehicle width direction is coplanar with an outer surface of the first cover member in the vehicle width direction, and the second cover member is fastened to the first cover member.

* * * * *